United States Patent [19]

Arnold et al.

[11] 4,053,458

[45] Oct. 11, 1977

[54] VULCANIZABLE RUBBER FORMULATIONS WITH BIS(SULFONAMIDO)SULFIDE

[75] Inventors: Robert J. Arnold, Evanston; Marion J. Gattuso, Hoffman Estates, both of Ill.

[73] Assignee: UOP Inc., Des Plaines, Ill.

[21] Appl. No.: 690,830

[22] Filed: May 27, 1976

Related U.S. Application Data

[63] Continuation-in-part of Ser. No. 571,340, April 24, 1975, abandoned, which is a continuation-in-part of Ser. No. 454,628, March 25, 1974, abandoned.

[51] Int. Cl.[2] .............................................. C08F 19/20

[52] U.S. Cl. .......................... 260/79.5 A; 260/79.5 B; 260/556 A; 260/780; 526/30; 260/556 B

[58] Field of Search ...................... 260/79.5 A, 79.5 B, 260/780; 526/30

[56] References Cited

U.S. PATENT DOCUMENTS 3,678,017 7/1972 Shelton ........................... 260/79.5 B
3,856,762 12/1974 Hopper ........................... 260/79.5 B
3,915,940 10/1975 Van der Kooi ................. 260/79.5 B

FOREIGN PATENT DOCUMENTS 951,719 10/1956 Germany ........................ 260/79.5 B

*Primary Examiner*—Christopher A. Henderson
*Attorney, Agent, or Firm*—James R. Hoatson, Jr.; Raymond H. Nelson; William H. Page, II

[57] ABSTRACT

Vulcanizable rubber formulations will contain, as an inhibitor therefor, a compound having the formula:

$$R-\overset{\overset{O}{\|}}{\underset{\underset{O}{\|}}{S}}-\underset{\underset{R'}{|}}{N}-S-\underset{\underset{R'}{|}}{N}-\overset{\overset{O}{\|}}{\underset{\underset{O}{\|}}{S}}-R$$

in which R and R' are independently selected from the group consisting of alkyl of from 1 to about 6 carbon atoms, cycloalkyl having from 3 to about 8 carbon atoms, phenyl and tolyl radicals. The aforesaid rubber formulations are exemplified by a styrene-butadiene rubber containing bis(N-methyl-p-toluenesulfonamido)-sulfide.

9 Claims, No Drawings

VULCANIZABLE RUBBER FORMULATIONS WITH BIS(SULFONAMIDO)SULFIDE

CROSS-REFERENCE TO RELATED APPLICATIONS

This application is a continuation-in-part of our copending application Ser. No. 571,340 filed Apr. 24, 1975, which is a continuation-in-part of our copending application Ser. No. 454,628 filed Mar. 25, 1974, both said applications being now abandoned.

BACKGROUND OF THE INVENTION

Rubber formulations, either synthetic or naturally occurring, must be processed in order to prepare finished products which are usable in industry. Among these processing features is the vulcanization of the rubber mixture by means well known in the art. In this respect various changes in the processing of rubber formulations have been adopted to facilitate the aforesaid processing, thereby improving the properties of the rubber products. Some of these changes, however, have resulted in a certain amount of premature vulcanization which is known in the trade as scorching and occurs prior to the desired vulcanization. Compounds may also be present in the rubber formulation which adversely effect the induction time or scorch duration period prior to vulcanization. For example, the rubber formulation may contain an antiozonant therein in order to impart protection to the finished rubber product against ozone cracking. Among the more popular antiozonants which are utilized for this purpose are the phenylenediamine type of compounds. However, this type of antiozonant appears to promote scorching or premature vulcanization. Another compound which may be present and which may have an adverse effect on the vulcanization period is a high pH furnace black which appears to lack the inherent inhibiting effect of the acidic channel blacks. In the past, it has been a common practice to utilize certain compounds to reduce the risk of scorching prior to vulcanization. However, such compounds as the N-nitrosoamine type of retarders often are of limited effectiveness or adversely affect the vulcanization process and the quality of the final product.

In contrast to this, it has now been found that compounds comprising bis(sulfonamido)sulfides of the formula:

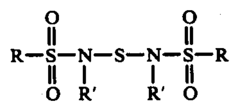

in which R and R' are independently selected from the group consisting of alkyl of from 1 to about 6 carbon atoms, cycloalkyl having from 3 to about 8 carbon atoms, phenyl and tolyl radicals may be utilized as premature vulcanization inhibitors with increased effectiveness in rubber formulations, exhibiting greater effectiveness than do bis(sulfonamido)disulfides. In addition to effectively inhibiting the premature vulcanization, the addition of the particular compounds of the present invention will not adversely effect the vulcanization process.

This invention relates to rubber formulations containing compounds of the type hereinafter set forth in greater detail as scorch inhibitors in the accelerated sulfur vulcanization of rubber formulations.

It is therefore an object of this invention to provide vulcanizable rubber formulations containing compounds of the type hereinafter set forth which will act as inhibitors against premature vulcanization of rubber.

In one aspect an embodiment of this invention resides in a vulcanizable rubber formulation containing, as an inhibitor against premature vulcanization thereof, a compound having the formula:

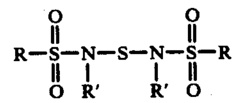

in which R and R' are independently selected from the group consisting of alkyl of from 1 to about 6 carbon atoms, cycloalkyl having from 3 to about 8 carbon atoms, phenyl and tolyl radicals.

A specific embodiment of this invention is found in a vulcanizable natural rubber formulation containing, as an inhibitor against the premature vulcanization of said rubber, bis(N-methyl-p-toluenesulfonamido)sulfide.

Other objects and embodiments will be found in the following further detailed description of the present invention.

As hereinbefore set forth the present invention is concerned with vulcanizable rubber formulations containing compounds for inhibiting the scorch in the accelerated sulfur vulcanization of rubber formulations, these compounds comprising bis(sulfonamido)sulfides. The compounds which are utilized as scorch inhibitors may be prepared by reacting two moles of an appropriate substituted sulfonamide with one mole of sulfur dichloride in the presence of at least two moles of an acid scavenger. The reaction between the substituted sulfonamide and the sulfur dichloride is preferably effected at reduced temperatures ranging from about 0° up to about 10° C. In addition, the reaction is also effected at atmospheric pressure. However, if so desired, alternative reaction conditions of elevated temperatures and pressures may be employed, although not necessarily with equivalent results.

Examples of substituted sulfonamides which may be used as one of the starting materials of the present process will comprise compounds possessing the generic formula:

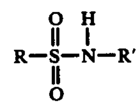

in which R and R' are independently selected from the group consisting of alkyl containing from 1 to about 6 carbon atoms, cycloalkyl containing from 3 to about 8 carbon atoms in the ring, phenyl and tolyl radicals. Representative examples of these compounds which may be employed will include N-methyl-benzenesulfonamide, N-ethyl-benzenesulfonamide, N-butyl-benzenesulfonamide, N-pentyl-benzenesulfonamide, N-hexyl-benzenesulfonamide, N-methyl-o-toluenesulfonamide, N-ethyl-p-toluenesulfonamide, N-propyl-o-toluenesulfonamide, N-butyl-o-toluenesulfonamide, N-pentyl-o-toluenesulfonamide, N-hexyl-o-toluenesulfonamide, N-methyl-m-toluenesulfonamide, N-ethyl-m-toluenesulfonamide, N-propyl-m-toluenesulfonamide, N-butyl-m-toluenesulfonamide, N-pentyl-m-toluenesulfonamide, N-hexyl-m-toluenesulfonamide, N-methyl-p-toluenesulfonamide, N-ethyl-p-toluenesulfonamide, N-propyl-p-toluenesulfonamide, N-butyl-p-toluenesulfonamide, N-pentyl-p-toluenesulfonamide, N-hexyl-p-toluenesulfonamide, N-cyclopropyl-benzenesulfonamide, N-cyclobutyl-benzenesulfonamide, N-cyclopentyl-benzenesulfonamide, N-cyclohexyl-benzenesulfonamide, N-cycloheptyl-benzenesulfonamide, N-cyclooctyl-benzenesulfonamide, N-methyl-methanesulfonamide, N-methylethanesulfonamide, N-methyl-propanesulfonamide, N-methyl-butanesulfonamide, N-methyl-pentanesulfonamide, N-methyl-hexanesulfonamide, N-phenyl-benzenesulfonamide, N-phenyl-o-toluenesulfonamide, N-phenyl-m-toluenesulfonamide, N-phenyl-p-toluenesulfonamide, etc. It is to be understood that the aforementioned compounds are only representative of the class of substituted sulfonamides and that the present invention is not necessarily limited thereto.

As hereinbefore set forth, the reaction between two moles of substituted sulfonamide and one mole of sulfur dichloride is effected in the presence of at least two moles of an acid scavenger. In the preferred embodiment of the invention the acid scavengers will be basic in nature such as tertiary amines. Examples of these tertiary amines which may be employed will include trimethylamine, triethylamine, tri-n-propylamine, triisopropylamine, tri-n-butylamine, tri-t-butylamine, etc. If so desired, the reaction may also be effected in the presence of an organic solvent such as dimethylformamide, diethylformamide, dipropylformamide, benzene, toluene, n-heptane, n-hexane, cyclopentane, cyclohexane, etc.

The preparation of the scorch inhibiting compounds which may be used in rubber formulations according to the present invention may be effected in any suitable manner and may comprise either a batch or continuous type operation. For example, when a batch type operation is used, a quantity of the substituted sulfonamide may be dissolved in an appropriate solvent such as, for example, dimethylformamide, and thereafter cooled to reduced temperatures preferably from about 0° to about 5° C. utilizing any cooling means known in the art as, for example, an ice bath. In addition, the solution of substituted sulfonamide in the appropriate solvent also will contain the tertiary amine. Following this, sulfur dichloride is slowly added to the solution which, upon completion of the addition, is allowed to warm to room temperature. After reaching ambient temperature, the solution is thereafter added to ice water and the organic layer is separated from said water. Following this, the organic layer is then treated by conventional means such as solvent removal, washing, drying, crystallization, recrystallization, etc., whereby the desired product is separated and recovered.

It is also contemplated within the scope of this invention that the desired product may be obtained in a continuous manner of operation. When this type of operation is employed, the starting materials are charged to a reaction zone which is maintained at the proper operating conditions of temperature and, if so desired, pressure. In addition, the reaction zone may contain the tertiary amine or solvent or, if so desired, these compounds may be admixed with one or both of the starting materials prior to entry into said reaction zone and the resulting mixture charged thereto in a single stream. Upon completion of the desired reaction time, the effluent is continuously removed and subjected to separation and recovery means similar in nature to those hereinbefore set forth, whereby the desired product is recovered while any unreacted starting materials may, after further treatment, be recycled to the reaction zone to form a portion of the feed stock.

The compounds which are prepared according to the above set forth processes and which are utilized as inhibitors to prevent the premature vulcanization of rubber formulations will possess the generic formula:

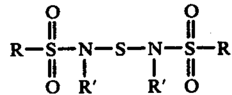

in which R and R' are independently selected from the group consisting of alkyl of from 1 to about 6 carbon atoms, cycloalkyl having from 3 to about 8 carbon atoms, phenyl and tolyl radicals. Some specific examples of these compounds will include bis(N-methyl-benzenesulfonamido)sulfide, bis-(N-ethyl-benzenesulfonamido)sulfide, bis(N-propyl-benzenesulfonamido)-sulfide, bis(N-butyl-benzenesulfonamido)sulfide, bis(N-pentyl-benzenesulfonamido)sulfide, bis(N-hexyl-benzenesulfonamido)sulfide, bis(N-methyl-p-toluenesulfonamido)sulfide, bis(N-ethyl-p-toluenesulfonamido)-sulfide, bis-(N-propyl-p-toluenesulfonamido)sulfide, bis(N-butyl-p-toluenesulfonamido)sulfide, bis(N-pentyl-p-toluenesulfonamido)sulfide, bis(N-hexyl-p-toluenesulfonamido)sulfide, bis(N-methyl-m-toluenesulfonamido)sulfide, bis(N-propyl-m-toluenesulfonamido)-sulfide, bis(N-pentyl-m-toluenesulfonamido)sulfide, bis(N-cyclohexyl-methanesulfonamido)sulfide, bis(N-cyclohexylethanesulfonamido)sulfide, bis(N-cyclohexyl-butanesulfonamido)sulfide, bis(N-cyclopentyl-p-toluenesulfonamido)sulfide, bis(N-methyl-ethanesulfonamido)sulfide, bis(N-methyl-butanesulfonamido)sulfide, etc. It is to be understood that the aforementioned compounds which are utilized as inhibitors for the premature vulcanization of rubber formulations are only representative of the class of compounds which may be utilized, and that the present invention is not necessarily limited thereto.

The aforementioned bis(sulfonamido)sulfides are used as inhibitors in rubber formulations in any suitable concentration, said concentration varying with the particular rubber formulation. In the preferred embodiment of the invention, the concentration may be within a range of from about 0.1 to about 5 and more specifically in a range of from about 0.1 to about 2 phr (parts per hundred parts by weight of rubber hydrocarbon).

As was previously set forth, these compounds are used in any vulcanizable rubber formulation, either synthetic or naturally occurring, in order to inhibit premature vulcanization. Some illustrative examples of the rubber formulations would include natural rubber, Buna S, SBR (styrenebutadiene), polymers of butadiene or copolymers thereof with other monomers such as, for example, acrylonitrile, isobutylene, methyl methacrylate, cis-4-polybutadiene, butyl rubber, ethylene propylene terpolymers, etc.

As was previously discussed, in order to protect the finished rubber product against cracking due to ozone, an antiozonant generally is incorporated in the rubber formulation. Any suitable antiozonant may be used and, in one embodiment, is of the p-phenylenediamine type. This type of compound will include, for example, N,N- di-sec-alkyl-p-phenylenediamines, in which each alkyl substituent contains from 3 to 12 carbon atoms, and N-phenyl-N'-sec-alkyl-p-phenylenediamines, in which the alkyl substituent contains from 3 to 12 carbon atoms, N,N'-dicyclohexyl-p-phenylendiamines, N-phenyl-N'-cyclohexyl-p-phenylenediamine, etc. In another embodiment, the rubber formulation may include antiozonants which are of the aminophenol types and include alkyl-substituted aminophenols in which the alkyl substituent on the nitrogen atom will contain from 3 to 20 carbon atoms or cycloalkyl-substituted p-aminophenols in which the cycloalkyl substituent on the nitrogen atom will contain from 3 to 12 carbon atoms in the ring. In most rubber formulations, the antiozonant may be present in a concentration of from about 1 to about 5 parts by weight per hundred parts of rubber hydrocarbon in the formulation.

In addition to the antiozonant, the rubber formulation will generally include a vulcanization accelerator. Any suitable vulcanizing accelerator may be used including the conventional types such as 2-mercaptobenzothiazole, N-cyclohexyl-2-benzothiazole sulfenamide, N-tert-butyl-2-benzothiazole sulfenamide, 2-(morpholinothio)-benzothiazole, N-phenyl-2-benzothiazole sulfenamide, amine salts of mercaptobenzothiazole accelerators, etc. Other accelerators include tetramethylthiuram disulfide, thiocarbamyl sulfenamides, thioureas, xanthates, guanidine derivatives, etc. The vulcanizing accelerator will be used in conventional concentrations in the rubber formulation and may be within the range of from about 0.4 to about 3.0 parts by weight per hundred parts of rubber hydrocarbon in the formulation. It is understood that smaller or larger concentrations may be used when desired.

As hereinbefore set forth, the compounds previously described are also present in the rubber formulation in order to retard or inhibit the scorch in the accelerated sulfur vulcanization of the rubber formulation when said vulcanization is carried out at the usual temperature which may range from about 120° to about 170° C. or more. By utilizing these compounds in a manner hereinafter shown in greater detail in the appended examples, it is possible to retard the scorch in the accelerated sulfur vulcanization of rubbers thus preventing any undesired premature vulcanization which may lead to finished rubber products which do not possess desirable characteristics. In addition, as will be shown in the examples, by utilizing these bis(sulfonamido)sulfides to inhibit the scorch in accelerated sulfur vulcanization processes will be greater than the inhibition which is obtained when utilizing no additives of this type as well as when utilizing bis(sulfonamido)disulfides. It was, therefore, unexpected that the bis(sulfonamido)sulfides of the present invention exhibit such a relatively greater scorch inhibition than compounds of similar configuration but which are substituted-disulfides rather than monosulfides.

The following examples are used to illustrate the novel compounds of the present invention and also to their use as prevulcanization inhibitors. However, these examples are not intended to limit the generally broad scope of the present invention in strict accordance therewith.

EXAMPLE I

A solution consisting of 37.0 grams (0.2 mole) of N-methyl-p-toluenesulfonamide and 22 grams (0.22 mole) of triethylamine in 150 cc of dimethylformamide was cooled to a temperature of 0° C. by means of an ice bath. Following this, 10.3 grams (0.1 mole) of sulfur dichloride was slowly added dropwise while maintaining the temperature of the solution in a range of from 0° to 10° C. During the addition of sulfur dichloride, the mixture turned a pale orange color with the concomitant formation of a white precipitate. Upon completion of the addition of the sulfur dichloride, the mixture was stirred for a period of 0.5 hours while maintaining the temperature in a range of from 0° to 5° C. Following this, the mixture was allowed to warm to room temperature. The solution, after reaching room temperature, was then slowly poured into 250 cc of stirred ice water. An amber oil separated and was taken up in ether. The ether solution was washed twice with water, dried over magnesium sulfate and the ether was stripped in a vacuum. The amber oil which remained was subjected to benzene addition with the formation of dense colorless crystals. The crystals were recovered and recrystallized from additional benzene until a constant melting point of 121° to 123° C. was reached. The crystals which comprised bis(N-methyl-p-toluenesulfonamido)sulfide were subjected to analysis with the following results:

Calculated For: $C_{16}H_{20}N_2O_4S_3$: C, 47.98%; H, 5.03%; N, 6.99%; S, 24.02% Found: C, 48.11%; H, 5.15%; H, 7.97%; S, 23.10%.

EXAMPLE II

To a solution of 25.5 grams (0.1 mole) of N-cyclohexyl-p-toluenesulfonamide and 6.5 grams (0.11 mole) of trimethylamine in 150 cc of dimethylformamide is slowly added 5.1 grams (0.05 mole) of sulfur dichloride, the addition of the sulfur dichloride being made while maintaining the temperature of the solution in a range of from 0° to 5° C. Upon completion of the addition of the sulfur dichloride, the mixture is stirred for an additional period of 0.5 hours while maintaining the solution in the aforesaid temperature range. At the end of the stirring time, the mixture is allowed to return to room temperature and thereafter slowly poured into 250 cc of stirred ice water. The oil phase of the mixture is then extracted with ether after which the ether extract is washed with water, dried over magnesium sulfate and the ether solvent is stripped therefrom. The crystals which result upon standing are recrystallized from benzene until a constant melting point is reached, said crystals comprising bis(N-cyclohexyl-p-toluenesulfonamido)sulfide.

EXAMPLE III

In the example a solution comprising 48.2 grams (0.2 mole) of N-hexyl-benzenesulfonamide and 22 grams (0.22 mole) of triethylamine are added to 150 cc of benzene following which the solution is then cooled to a temperature of 0° C. by means of an ice bath. The solution is maintained at this temperature while 10.3 grams (0.1 mole) of sulfur dichloride is slowly added thereto. Upon completion of the addition of the sulfur dichloride, the solution is allowed to warm to room temperature and thereafter is slowly poured into 250 cc of stirred ice water. The organic layer is separated, washed with water, dried over magnesium sulfate and concentrated under vacuum. The crystals which will precipitate upon standing are recrystallized from a benzene solvent, said crystals comprising bis(N-hexylbenzenesulfonamido)sulfide.

EXAMPLE IV

A solution comprising 43.4 grams (0.2 mole) of N-cyclohexylbutanesulfonamide and 22 grams (0.22 mole) of triethylamine in 150 cc of toluene is cooled to a temperature of 0° C. by means of an ice bath. The solution is maintained at this temperature while 10.3 grams (0.1 mole) of sulfur dichloride is added dropwise to the solution. After completing the addition of the sulfur dichloride to the solution, it is stirred for an additional period of 0.5 hours while maintaining the temperature of the solution in a range of from 0° to 5° C. Thereafter the vessel is removed from the ice bath and allowed to warm to room temperature, following which the solution is slowly poured into 250 cc of stirred ice water. The organic layer is separated, washed with water, dried over magnesium sulfate and the solvent is stripped therefrom to afford a viscous yellow oil comprising bis(N-cyclohexyl-butanesulfonamido)sulfide.

EXAMPLE V

In a manner similar to that set forth in the above examples, a solution comprising 150 cc of benzene, 45.4 grams (0.2 mole) of N-butyl-p-toluenesulfonamide and 13 grams (0.22 mole) of trimethylamine is cooled to a temperature of 0° C. by means of an ice bath. Thereafter 10.3 grams (0.1 mole) of sulfur dichloride is slowly added while constantly stirring the mixture and maintaining the temperature in the range of from 0° to 5° C. Upon completion of the addition of the sulfur dichloride, the solution is stirred for an additional period of 0.5 hours and removed from the ice bath. After warming to room temperature, the solution is then poured into 250 cc of stirred ice water. The organic layer is separated, washed with water, dried over magnesium sulfate and concentrated under vacuum, the desired product comprising bis(N-butyl-p-toluenesulfonamido)sulfide being recovered therefrom.

EXAMPLE VI

To illustrate the ability of the compounds previously set forth in greater detail to act as scorch inhibitors in accelerated vulcanization of rubber, the scorch properties of a rubber formulation were determined with a large rotor Mooney Viscometer at 250° F. (ASTM D-1077-55T). The values which are set forth in the table below represent the number of minutes for a rubber containing a curing agent to increase in viscosity by 1 and then by 10 points. This method simulates conditions encountered during milling and subsequent vulcanization. A long scorch time indicates a high resistance to scorching. A rubber formulation was prepared according to the following recipe:

| Ingredient | Parts by Weight |
|---|---|
| SBR 1502 | 100.00 |
| Furnace Black | 40.00 |
| Oil Extender | 10.00 |
| Zinc Oxide | 3.00 |
| Stearic Acid | 2.00 |
| Sulfur | 2.00 |
| Antiozonant | 2.00 |
| Inhibitor | 0.50–1.00 |
| Accelerator | 1.25 |

The above ingredients were incorporated by conventional milling procedures and the formulations were cured in the Mooney Viscometer.

The results of these evaluations are reported in the following table along with a control run which was made without the use of scorch inhibitor, this being reported as Run A. In Run B the rubber formulation contained 0.50 parts by weight of bis(N-methyl-p-toluenesulfonamido)sulfide as the inhibitor while Run C contained 1.00 parts by weight of this same inhibitor. In order to illustrate the unexpected scorch resistant properties of the sulfides as compared to similar disulfide compounds, two more runs were made. Run D contained 0.50 parts by weight of an inhibitor comprising bis(N-methyl-p-toluenesulfonamido)disulfide while Run E contained 1.00 parts by weight of the disulfide compound. The results are set forth in Table I below:

TABLE I

| Run | Mooney Scorch Data: 1 Pt Rise (Min.) | 10 Pt Rise (Min.) | Δ10-1 (Min.) | % Increase in 1 Pt Rise |
|---|---|---|---|---|
| A | 5.6 | 6.8 | 1.2 | — |
| B | 10.5 | 11.8 | 1.3 | 87.5 |
| C | 11.9 | 13.6 | 1.7 | 113.5 |
| D | 6.0 | 7.3 | 1.3 | 7.1 |
| E | 7.9 | 9.1 | 1.2 | 42.7 |

It is to be noted from the above table that the rubber formulations which contained the scorch inhibitors of the present invention, namely, Runs B and C, exhibited a percentage increase in the 1 point rise time of 87.5 and 113.0 respectively. This contrasts with the percentage of increase in the 1 point rise time when utilizing similar disulfide compounds of 7.1 and 42.7 respectively. The percent increase in the 1 point rise when using 0.50 parts by weight of the sulfide compound was over 12 times the percent increase of the corresponding disulfide compound. Likewise, the percent increase in 1 point rise using 1.00 parts by weight of the compound of the present invention was over 2.5 times that which was exhibited when using 1.00 parts by weight of the corresponding disulfide compound. It is thus readily apparent that the monosulfide compounds of the present invention exhibited an unexpected percentage increase in the 1 point rise over that which was exhibited by the corresponding disulfide compounds.

EXAMPLE VII

When other compounds such as bis(N-hexyl-benzenesulfonamido)sulfide, bis(N-cyclohexyl-butanesulfonamido)sulfide, bis(N-cyclohexyl-p-toluenesulfonamido)sulfide and bis(N-butyl-p-toluenesulfonamido)sulfide are admixed with similar rubber formulations such as butyl rubber, a natural rubber, etc., it will also be found that the premature vulcanization of rubber formulations will also be inhibited in like manner.

We claim as our invention:

1. A vulcanizable diene rubber formulation containing, as an inhibitor against premature vulcanization thereof, a compound having the formula:

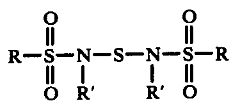

in which R and R′ are independently selected from the group consisting of alkyl of from 1 to about 6 carbon atoms, cycloalkyl having from 3 to about 8 carbon atoms in the ring, phenyl and tolyl radicals.

2. The formulation of claim 1 in which said compound is bis(N-methyl-p-toluenesulfonamido)sulfide.

3. The formulation of claim 1 in which said compound is bis(N-hexyl-benzenesulfonamido)sulfide.

4. The formulation of claim 1 in which said compound is bis(N-cyclohexyl-butanesulfonamido)sulfide.

5. The formulation of claim 1 in which said compound is bis(N-cyclohexyl-p-toluenesulfonamido)sulfide.

6. The formulation of claim 1 in which said compound is bis(N-butyl-p-toluenesulfonamido)sulfide.

7. The formulation of claim 1 in which said vulcanizable rubber is a styrene-butadiene rubber.

8. The formulation of claim 1 in which said vulcanizable rubber is a natural rubber.

9. The formulation of claim 1 in which said vulcanizable rubber is butyl rubber.

* * * * *